(12) United States Patent
Kangasmaa et al.

(10) Patent No.: US 8,023,438 B2
(45) Date of Patent: Sep. 20, 2011

(54) ANALOG SIGNAL PATH MODELING FOR SELF-INTERFERENCE CANCELLATION

(75) Inventors: Seppo Kangasmaa, Helsinki (FI); Sami Haapoja, Helsinki (FI); Ulo Parts, Helsinki (FI)

(73) Assignee: Nokia Corporation, Espoo (FI)

( * ) Notice: Subject to any disclaimer, the term of this patent is extended or adjusted under 35 U.S.C. 154(b) by 984 days.

(21) Appl. No.: 11/982,991

(22) Filed: Nov. 6, 2007

(65) Prior Publication Data

US 2008/0107046 A1    May 8, 2008

Related U.S. Application Data

(60) Provisional application No. 60/857,012, filed on Nov. 6, 2006.

(51) Int. Cl.
*H04B 3/20* (2006.01)
*H04J 1/16* (2006.01)

(52) U.S. Cl. .................. 370/286; 370/252; 370/419

(58) Field of Classification Search .......... 370/286–292, 370/252, 419
See application file for complete search history.

(56) References Cited

U.S. PATENT DOCUMENTS

| | | | |
|---|---|---|---|
| 6,996,164 B1 | 2/2006 | Blount et al. | 375/219 |
| 2006/0135076 A1 | 6/2006 | Honkanen et al. | 455/67.13 |
| 2007/0042721 A1* | 2/2007 | Gupta et al. | 455/73 |
| 2007/0178856 A1* | 8/2007 | Mitzlaff et al. | 455/127.1 |

FOREIGN PATENT DOCUMENTS

| | | |
|---|---|---|
| WO | WO 02/27950 A2 | 4/2002 |
| WO | WO 03/061184 A1 | 7/2003 |
| WO | WO 2005/050896 A2 | 6/2005 |

OTHER PUBLICATIONS

"Advanced OFDM-CDMA HF Modem With Self-Interference Cancellation", I. Raos et al., IEEE 2003, pp. 383-386.

* cited by examiner

*Primary Examiner* — John Pezzlo
(74) *Attorney, Agent, or Firm* — Harrington & Smith (57) ABSTRACT

Described herein is a device that includes at least one radio frequency transmitter; at least one radio frequency receiver; a copy block configurable to output a digital representation of a currently transmitted signal and a model having a representation of at least analog circuitry of the at least one radio frequency transmitter and analog circuitry of the at least one radio frequency receiver, as well as possibly one or more antennas. The model generates, in response to the digital representation of the currently transmitted signal, a self-interference compensation signal to compensate, in the digital domain, a signal that is received simultaneously with the currently transmitted signal. Also described are corresponding apparatus, methods, computer program instructions stored in a memory medium, and an integrated circuit embodiment.

35 Claims, 4 Drawing Sheets

ANALOG SIGNAL PATH MODELING FOR SELF-INTERFERENCE CANCELLATION

CLAIM OF PRIORITY FROM COPENDING PROVISIONAL PATENT APPLICATION

This patent application claims priority under 35 U.S.C. §119(e) from U.S. Provisional Patent Application No. 60/857,012, filed Nov. 6, 2006, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques to achieve self-interference cancellation in a device that includes at least one transmitter and at least one receiver that may be simultaneously active.

BACKGROUND

Several abbreviations that are found in the ensuing text and/or in the drawing Figures are defined as follows:
BB base band
DFE digital front-end
FE front-end
HW hardware
IC integrated circuit
LUT look up table
MRC multiradio controller
RF radio frequency
RX receiver
SIC self-interference cancellation
TX transmitter In practice any transmitted signal can couple into a receiver through signal path parasitics such as, but not limited to, imperfect isolation between antennas and/or the use of two or more signal branches. Depending on the coupling level the interfering TX signal can desensitize a simultaneously operating receiver, such as in full duplex system or in the case of inter-system operation (e.g., two separate radio transceivers that operate simultaneously within one device), and totally degrade or at least significantly impair the operation of the receiver. This problem is made worse by the current trend towards increased chipset integration levels, where more circuits and circuit sub-systems are integrated into one IC or a few closely adjacent ICs.

One potential technique to alleviate this problem is to use a portion of the transmitted signal in the analog domain, such as at the output of a TX power amplifier, in order to cancel the self-interference component in the received signal. This approach requires summing the distorted RX signal with the portion of the TX signal, which in turn requires coupling the TX signal to the summing function so as to have the proper phase and amplitude. However, since the coupled TX signal manipulation is performed at least partially in analog domain, the accuracy and power consumption are not optimal, and in practice can be difficult to implement.

Reference may be had, for example, to U.S. Pat. No. 6,996,164 B1, Self-Interference Removal Using Converted Compensation in a Relayed Communication System, Blount et al., which describes a receiver section of a relayed communication system. A method is described for removal of self-interference that includes modeling downconversion imperfections in an imperfectly downconverted signal from a receiver downconverter. The receiver downconverter is in the receiver section that receives both an intended signal and a self-generated signal from a local associated transmitter that forms a received relayed composite signal. The method compensates for the downconversion imperfections in the received relayed composite signal to produce a compensated composite signal, and cancels self-generated signal portions from the compensated composite signal to provide an output signal for demodulation. The receiver downconverter model imperfections include at least one of quadrature phase offset, quadrature d.c. imbalance, and quadrature amplitude imbalance.

SUMMARY

The foregoing and other problems are overcome, and other advantages are realized, by the use of the exemplary embodiments of this invention.

In a first aspect thereof the exemplary embodiments of this invention provide a method that comprises applying a digital representation of a currently transmitted signal to a model to generate a self-interference compensation signal, the model comprising a representation of at least analog circuitry of a transmitter and analog circuitry of a receiver; and compensating in the digital domain a signal that is received simultaneously with the currently transmitted signal using the generated self-interference compensation signal.

In another aspect thereof the exemplary embodiments of this invention provide a data storage medium that stores a program of computer-executable instructions, where execution of the instructions results in operations that comprise applying a digital representation of a currently transmitted signal to a model to generate a self-interference compensation signal, the model comprising a representation of at least analog circuitry of a transmitter and analog circuitry of a receiver; and compensating in the digital domain a signal that is received simultaneously with the currently transmitted signal using the generated self-interference compensation signal.

In another aspect thereof the exemplary embodiments of this invention provide an apparatus that comprises at least one radio frequency transmitter; at least one radio frequency receiver; a copy block configurable to output a digital representation of a currently transmitted signal and a model that comprises a representation of at least analog circuitry of the at least one radio frequency transmitter and analog circuitry of the at least one radio frequency receiver. The model generates, in response to the digital representation of the currently transmitted signal, a self-interference compensation signal to compensate in the digital domain a signal that is received simultaneously with the currently transmitted signal.

In another aspect thereof the exemplary embodiments of this invention provide an integrated circuit that includes at least a portion of at least one radio frequency transmitter; at least a portion of at least one radio frequency receiver; a copy block configurable to output a digital representation of a currently transmitted signal and a controller configurable to operate a model in accordance with current operating characteristics. The model comprises a representation of at least analog circuitry of the at least one radio frequency transmitter and analog circuitry of the at least one radio frequency receiver, and generates in response to the digital representation of the currently transmitted signal a self-interference compensation signal to compensate in the digital domain a signal that is received simultaneously with the currently transmitted signal.

In a further aspect thereof the exemplary embodiments of this invention provide an apparatus that comprises means for transmitting at least one radio frequency signal; means for receiving at least one radio frequency signal; means for outputting a digital representation of a currently transmitted radio frequency signal and means for modeling a representation of at least analog circuitry of the transmitting means and analog circuitry of the receiving means. The modeling means generates in response to the digital representation of the currently transmitted signal a self-interference compensation signal for compensating, in the digital domain, a radio frequency signal that is received simultaneously with the currently transmitted radio frequency signal.

DETAILED DESCRIPTION

The exemplary embodiments of this invention pertain to self-interference cancellation (SIC), where a transmitter is used simultaneously with a receiver such as in the case of, for example, full duplex radio communication system operation and/or in a multiradio use-case scenario.

Figure 1:
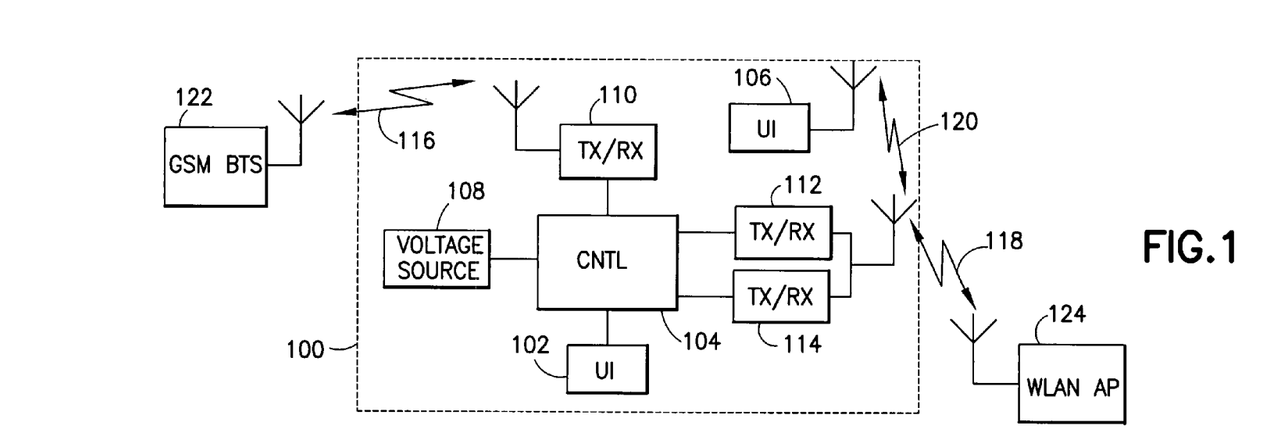
FIGS. 1 and 2 are similar to FIGS. 1 and 2 of US 2006/0135076 A1, and show a block diagram of a communication device having a plurality of radio connections, and an example of an architecture of a communication device that includes a multiradio controller, respectively.
Figure 2:
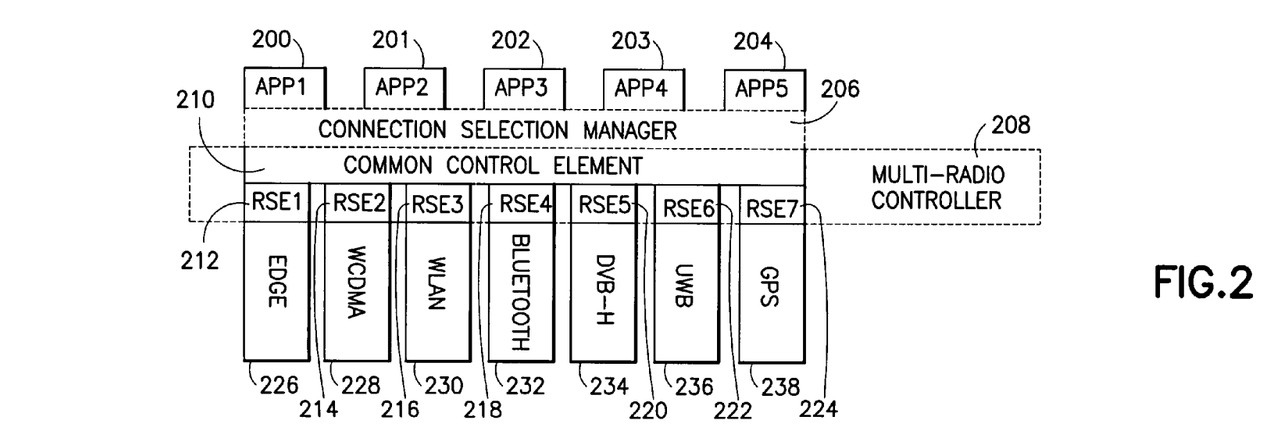

Reference with regard to the MRC concept can be had to commonly owned U.S. Patent Application Publication US 2006/0135076 A1, "Method and Device for Controlling Radio Access", by Mauri Honkanen, Mika Kasslin, Pasi Katajainen and Niko Kiukkonen. FIGS. 1 and 2 herein are based on FIGS. 1 and 2 of US 2006/0135076 A1, and are described below for showing one suitable (and non-limiting) embodiment of a multiradio device that can benefit from the use of the exemplary embodiments of this invention.

FIG. 1 shows a communication device 100 that may be, as non-limiting examples, a personal communication device such as a mobile communication device, a radio telephone, a cellular phone, a computer, a laptop, or a PDA (Personal Digital Assistant). The communication device 100 may also be a combination of two or more electronic devices, such as a computer with a mobile communication device connected to or integrated with the computer.

In general, various embodiments of the device 100 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The communication device 100 comprises a number of communication interfaces 110 to 114 to provide a wireless radio connection. The communication interfaces 110 to 114 may be configured to provide connections employing different radio access technologies. In this non-limiting example, the communication interface 110 provides a communication link 116 with a GSM (Global System for Mobile Communications)-system through a serving GSM base transceiver station 122. The communication interface 114 provides a WLAN (Wireless Local Area Network) connection 118 with a serving WLAN access point 124. A communication interface 112 provides another wireless connection 120, using Bluetooth®-technology, with a user interface component 106. The user interface component 106 may be for example a headset of a mobile telephone, comprising a microphone, a loudspeaker, and a communication interface for a Bluetooth® connection with the mobile telephone. The user interface component 106 may also be a keyboard or a mouse operating with a computer through a Bluetooth® link.

The communication interfaces 110 to 114 described above may at least partially use the same components of the communication device 100 during the operation of radio connections 116 to 120. The communication interfaces 110 to 114 may be using, for example, the same antenna or antennas, radio frequency amplifier, and/or radio frequency filter. Each communication interface 110 to 114 may have its own components, or only some of the communication interfaces 110 to 114 may be using the same components.

In the example of FIG. 1 the three communication interfaces 110 to 114 provide the GSM BTS 122 connection 116, the Bluetooth connection 120, and the WLAN access point (AP) 124 connection 118, respectively. It should, however, be appreciated that the communication device is limited neither to the number of communication interfaces in the communication device nor to the wireless communication technology the communication interfaces provide. Thus, the communication device 100 may comprise several communication interfaces providing connections based on, as non-limiting examples, the following technologies: GSM, WLAN, Bluetooth®, WCDMA (Wideband Code Division Multiple Access), GPRS (General Packet Radio Service), EDGE (Enhanced Data Rates for GSM Evolution), DVB-H (Digital Video Broadcasting for Handheld devices), UWB (Ultra Wideband), GPS (Global Positioning System), CDMA2000, or so-called LTE (Long Term Evolution) technologies such as 3GPP UTRAN (universal terrestrial radio access network) LTE, also known as evolved or E-UTRAN, or RAN-part of 3.9G technologies currently being specified in 3GPP. Other wireless communication technologies are also possible to be implemented in the communication device.

The communication device 100 further comprises a control unit 104 to control functions of the device 100. The control unit 104 creates radio connections between the communication device 100 and other communication devices or networks. The control unit 104 also controls a number of simultaneous radio connections in the communication device 100. The control unit 104 may be implemented with a digital signal processor with suitable software or with separate logic circuits, for example, with an ASIC (Application Specific Integrated Circuit). The control unit 104 may also be a combination of these two implementations, such as a processor with suitable software embedded within an ASIC.

The communication device 100 may further include a user interface 102 connected to the control unit 104. The user interface 102 may comprise a keyboard, a microphone, a loudspeaker, a display, and/or a camera.

The communication device 100 usually comprises a voltage source 108 to provide current for the operation of the device 100. The voltage source may be, as two non-limiting examples, a rechargeable battery or a fuel cell.

FIG. 2 illustrates an example of an architecture of the communication device 100. The architecture is depicted for convenience, and not as a limitation, in a layered form such as in an OSI (Open Systems Interconnection) model of the ISO (International Organization for Standardization), with lower layers providing services to higher layers.

On the highest layer are provided applications 200 to 204 that may require a radio connection. The applications 200 to 204 may be, as non-limiting examples, applications for handling a voice call, a web or WAP (Wireless Application Protocol) browser, an e-mail client, a GPS navigation application, a gaming application, or a media player. The communication device 100 may comprise more or fewer than the illustrated five applications, and may also comprise other applications. Whenever an application 200 to 204 needs a radio connection to another communication device or network, the application sends a request to a lower layer to establish the connection. During the operation of the connection, the application sends data related to the application to lower layers for transmission over the connection to the other communication device. Similarly, the application receives data related to the application from the other communication device via the connection through the lower layers. When a need no longer exists to maintain the connection, the application sends a request to a lower layer to terminate the connection.

On the lower layer, services may be provided to the applications 200 to 204 by a connection selection manager 206. The connection selection manager 206 may select an appropriate connection for an application based on a set of connection profiles stored in its database. A user or an operator, for example, may define the connection profiles, and the profiles may be based on optimization of some criterion, for example throughput, bit error rate or cost-efficiency of the connection. The connection selection manager 206 is an optional layer in the architecture of the communication device 100, since the applications 200 to 204 may be designed to define the suitable connections by themselves.

The next lower layer is a multiradio controller 208. The multiradio controller 208 establishes, controls, and terminates radio connections according to the connection requirements from the higher layers. The multiradio controller 208 is also responsible for managing the (possibly) simultaneous operation of multiple radio connections.

The multiradio controller 208 may be a two-fold entity. First, there may be a common control element 210, which communicates with the higher layers to receive requests for creating and terminating a radio connection from the applications 200 to 204 or, if applied, the connection selection manager 206. The common control element 210 may also check the availability of the radio connection requested from a higher layer, and either start a process for creating a radio connection or inform higher layers that the requested radio connection is not currently available. The common control element 210 is also responsible for controlling the simultaneous operation of multiple radio connections by adjusting the parameters of an existing connection whenever a new radio connection is created which would interfere with an existing radio connection is created, or whenever the common control element 210 detects a sufficient change in the properties of an existing connection.

The multiradio controller 208 also comprises radio-specific entities 212 to 224. Each radio-specific entity can be seen as an interface between the common control element 210 of the multiradio controller 208 and the specific radio interface. A radio-specific entity takes care of controlling one radio connection according to the parameters received from the common control element 210. A radio-specific entity is close to the physical (PHY) layer of the connection, which enables rapid adaptation to the changing environment and rapid control of the connection. The functionality of each radio-specific entity is radio-system-specific, which means that the parameters from the common control element 210 are applied to the standard specifications of the radio system. A radio-specific entity may also supply the common control element 210 with the measured properties of the connection it controls. The measured properties of the connection may comprise the bit error rate (BER), block error rate, or the frame error rate (FER) of the connection. The measured properties may also comprise received energy per chip divided by the noise power density in the band (Ec/No), interference signal code power (ISCP), received signal code power (RSCP), received signal strength indicator (RSSI), and/or signal-to-interference-power ratio (SIR).

In an embodiment of the multiradio controller the radio-specific entities are not included in the multiradio controller. Instead, the multiradio controller may have an interface to an external entity providing interfaces to each radio-specific entity.

Below the radio-specific entities 212 to 224 in FIG. 2 are provided the communication interfaces 226 to 238. Each communication interface 226 to 238 is responsible for encoding and decoding data into suitable electrical waveforms for transmission to, and reception from, the specific physical medium that is used. This process is carried out according to each radio-access-specific standard. The exemplary architecture of FIG. 2 employs physical (PHY) layers of EDGE, WCDMA, WLAN, Bluetooth®, DVB-H, UWB and GPS radio access technologies. However, the operation of the multiradio controller 208 is not limited to these technologies, as it can be configured to control other and/or more or fewer, wireless radio access technologies.

Having thus described aspects of the non-limiting embodiments of the multiradio architecture disclosed in the U.S. Patent Application Publication US 2006/0135076 A1, it may be appreciated that a consideration that can arise during operation of such a multiradio system is how to best alleviate self-interference. This can be achieved, for example, by aligning the simultaneously active, problematic radios in the time domain to avoid overlapping of active slots. This is possible since the multiradio controller 208 can be assumed to have knowledge of impending changes in active radio bearer properties (e.g., data rate, activity time, TX power level and frequency, as non-limiting examples) well in advance of the occurrence of the actual changes in the PHY layer. However, this approach may not always be technically feasible.

It may be further appreciated that in a highly integrated multiradio platform (i.e., one having a plurality of systems on the same IC) at least one efficient self-interference cancellation algorithm, function and/or procedure is desirable to accommodate the simultaneous operation of two or more of the communication interfaces 226 to 238 shown in FIG. 2. The exemplary embodiments of this invention provide such efficient self-interference cancellation algorithms, functions and/or procedures, and do so without requiring operation of the self-interference cancellation algorithms, functions and/or procedures in the analog signal domain.

Figure 3:
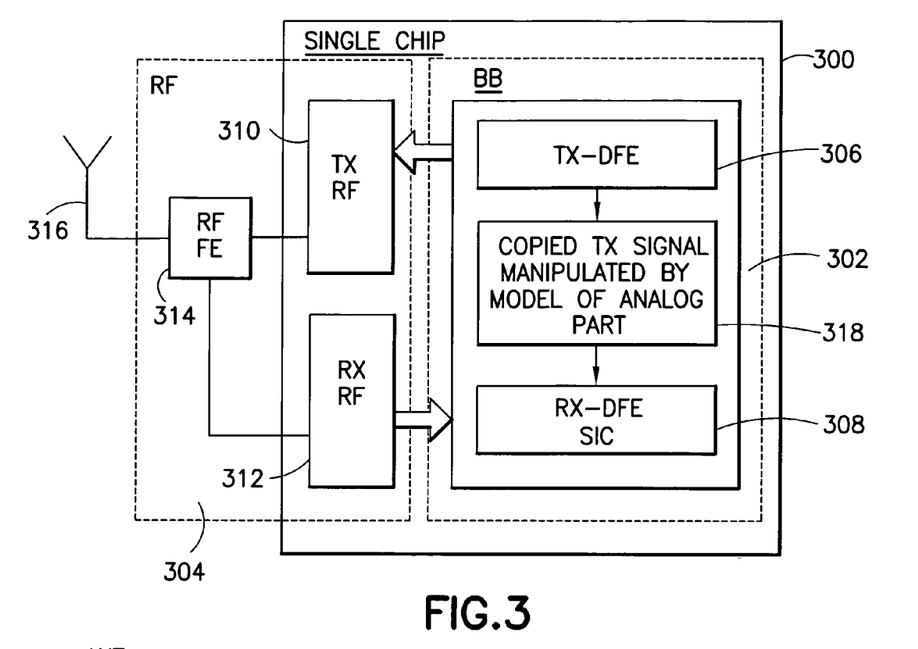
FIG. 3 is a block diagram of a self-interference cancellation embodiment within one system, in accordance with the exemplary embodiments of this invention.

In accordance with the exemplary embodiments of this invention self-interference due to a simultaneously active TX is modeled (with at least some or all of the non-idealities in the TX chain) and taken into account during interference cancellation in a "victim" RX that may be located on the same IC. This is achieved through the use of a characterization block in the digital domain. This principle can be used within a single system (i.e., one having a single RF TX and a single RF RX, as shown in FIG. 3) or in a multiradio system (shown in FIG. 4). In the latter case the MRC 208 provides the activity timing of the interfering TX, as well as any pertinent radio parameters (such as the operating frequency band and the modulation scheme, as non-limiting embodiments). In the former, single system, case a radio controller function provides needed timing and other pertinent information.

Figure 4:
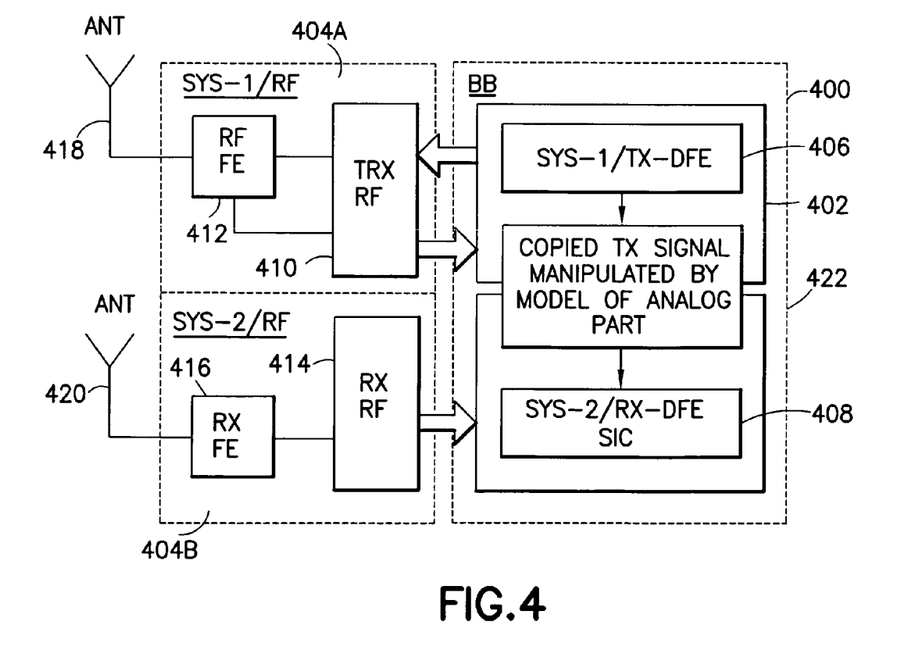
FIG. 4 is a block diagram of the self-interference embodiment within a multiradio system, in accordance with further embodiments of this invention.

The use of a characterization block 318, 422 for self-interference cancellation within one system, or in the multi-radio system environment, are shown in FIGS. 3 and 4, respectively, is now described in further detail.

In the single system embodiment (e.g., any system in which full duplex operation is possible) of FIG. 3 a single IC 300 may include both the TX BB and the RX BB circuitry 302, and at least part of the RF circuitry 304. The BB circuitry 302 includes the TX-DFE 306 and the RX-DFE and SIC block or function 308, which are coupled together by the characterization block 318. In the characterization block 318 a copied TX signal (in the digital domain) is manipulated by a model 504 (see FIG. 5) of the analog part. The model 504 preferably models at least the TX RF 310, RF FE 314, antenna(s) 316, RX RF 312, including linear and non-linear effects with mutual coupling, and possibly also an effect of IC 300 on the signal, such as package, substrate and/or input/output pin coupling mechanisms. Shown for completeness is the RX RF 312 that receives an input from the RF FE 314 that in turn is coupled to an antenna 316. The same or a different antenna 316 may be used by the TX function, depending on the implementation of the communication system.

In the multiradio system embodiment (e.g., a GSM system (Sys-1) and a WLAN system (Sys-2) as one non-limiting embodiment) of FIG. 4, a single IC 400 may include both the multiradio TX BB and the RX BB circuitry 402, and at least part of the RF circuitry 404A and 404B. The BB circuitry 402 includes a first system (Sys-1) TX-DFE 406 and a second system (Sys-2) RX-DFE and SIC 408, which are coupled together by the characterization block 422. In the characterization block 422 the copied Sys-1 TX signal (in the digital domain) is manipulated by the model 504 of the analog part. The model 504 preferably models at least the Sys-1 TX/RX (TRX) RF 410, RF FE 412, antennas 418, 420, the RX FE 416, the RX RF 414, including linear and non-linear effects with mutual coupling, and possibly an effect of the IC 400 effects on the signal, including package, substrate and/or input/output pin coupling mechanisms, as well as module level 400, 404A, 404B coupling mechanisms. Also shown is the Sys-2 RX RF 414 that receives an input from the Sys-2 RF FE 416 that in turn is coupled to an antenna 420. In this embodiment it may typically be the case that a separate antenna 418 is used by the Sys-1 TX/RX function.

Figure 5:
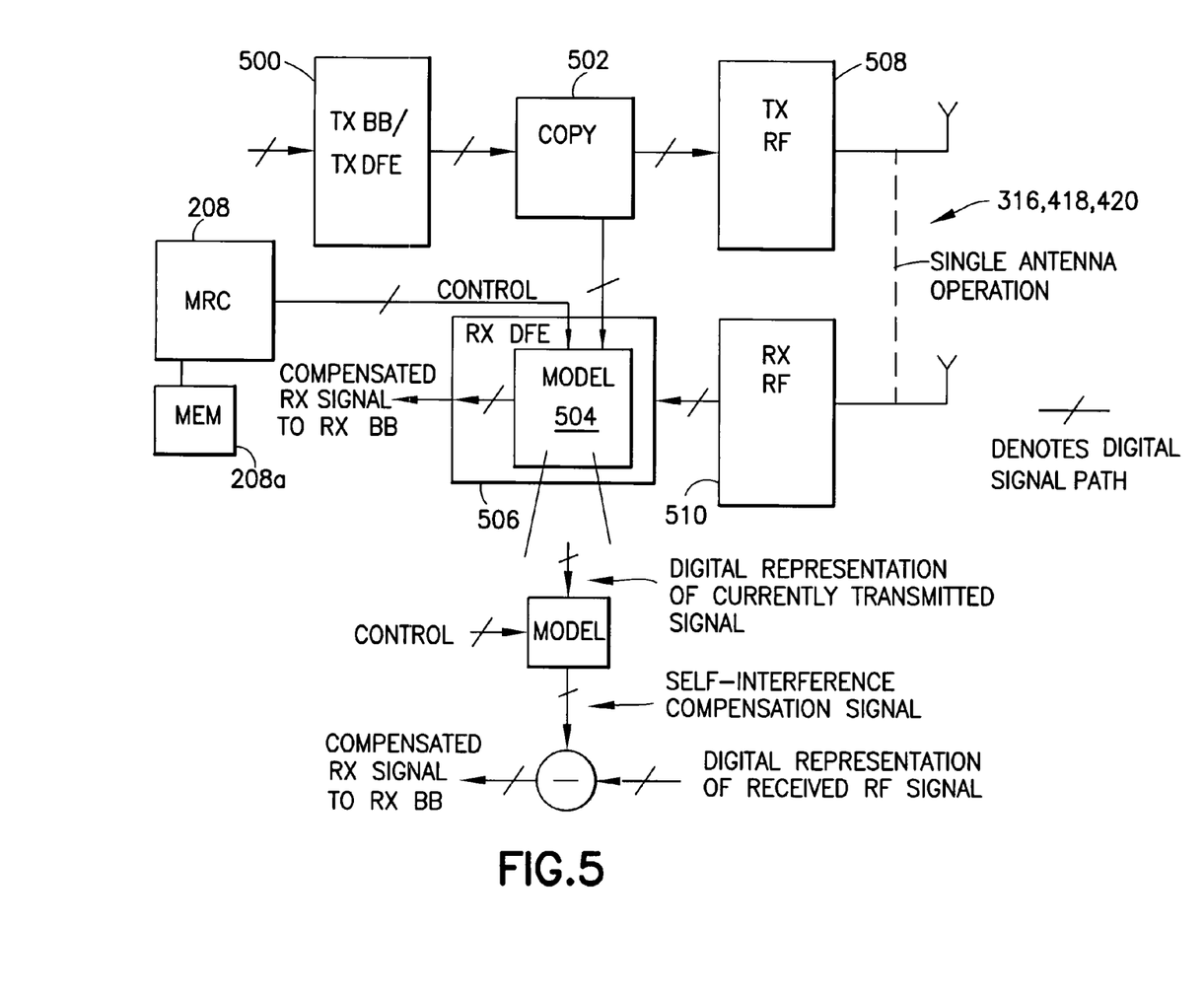
FIG. 5 is a block diagram that shows in greater detail the self-interference cancellation function that is illustrated in FIGS. 3 and 4.

Referring now also to FIG. 5, the SIC functions in accordance with the exemplary embodiments of this invention to alleviate intersystem interference (e.g., the TX signal of Sys-1 is interfering with the receiver of Sys-2, where the modem HW of both systems are at least mostly located on the same IC) as follows.

The digital TX signal from the TX BB/TX DFE of Block 500 is "copied" in the digital domain in Block 502 before being fed further to the analog TX RF 508 for digital to analog conversion and further processing. The copy block 502 may be implemented by, e.g., a simple fork operation. The copied digital TX signal is applied to the above-mentioned model 504 that creates a duplicate of the TX signal that interferes with the operation of the receiver path (RX-RF 510, RX-DFE 506), including the antenna(s) 316, 418, 420. The model 504 may be created with digital signal processing HW (filtering, LUTs and so forth) and the model 504 is configured to operate with a control processor, such as the MRC 208 for the case of the multiradio embodiment of FIGS. 1, 2 and 4. In the single system embodiment of FIG. 3 the control processor is a single system control processor. It is assumed that the control processor, such as the MRC 208 for the case of the multiradio embodiment, operates in accordance with computer instructions stored in a memory medium (MEM) 208a. Note that all or some of the model 504 may be embodied as computer program instructions that are stored in the same or a different memory medium. The memory 208a may be based on any suitable memory storage technology, including semiconductor-based memory, magnetic-based memory, and optical-based memory.

The analog TX-RF 508 characterization, as well as any measurements related to TX leakage to the "victim" receiver (510, 506, including antennas) may be performed beforehand and included in the model 504. Any calibration of the model 504 may be performed when the TX-RF 508 is active, such as during chip testing, during assembled device production testing and/or during normal operation in the field. The model 504 thus may include, for example, TX-RF 508 signal phase and amplitude distortion characteristics, coupling between antennas, upconversion mixer leakage and impedance mismatch effects, as well as other device-related factors, such as switching power supply spurious frequencies in different modes of operation, parasitic coupling between signal lines and traces, clock signal coupling between signal lines and traces, as well as any other factors that can possibly affect, such as coupling into, the operation of the RX-RF 510 and RX-DFE 506 when the TX-RF 508 is active.

The actual timing instant of the TX signal cancellation in the "victim" receiver is triggered by the MRC 208, which is assumed to have knowledge of the active radio bearers/systems in the device, their activity times and signaling properties.

In general, the model 504 may be parameterized for supporting several wireless protocols, single system and multi-system usage, as well single antenna and multi-antenna operation. The related system parameters may be divided also as to linear and non-linear parameters. The former parameters are essentially constant over the power level, while the latter parameters are generally dependent on the signal level. The MRC 208 has system information concerning the signal parameters that are used, such as frequency, modulation and power level (as non-limiting examples), as well as the wireless system in use, the MCU/CPU, bus and so forth, as well as clock frequencies which may have an effect on the received signal. Also, possible inter-modulation and signal mixing products may be indicated based on the system information. Thus, the MRC 208 provides a valid parameter set to the SIC function (308,408) depending on the multi-radio system combination in use, and the current signal timing and power status. A default parameter set and associated values may be based at least in part on system and circuit simulation(s). The actual system calibration procedure, for example during at least one of development, production testing and during normal operation, provides more detailed information concerning the actual system. For example, the actual antenna(s) that are used may not be present during a chip or module level characterization, but these effects (such as coupling between antennas), can be accounted for after final assembly and actual use.

The result is that the model 504 generates a signal that is indicative of at least the actual self-interference of the TX analog circuitry into the RX analog circuitry, based on the current, actual TX signal and in accordance with a current mode of operation (e.g., TX power level, modulation type and signal timings, as non-limiting examples), and the generated signal can then be subtracted from or otherwise removed from the actual RX signal (in the digital domain), thereby providing an improved and enhanced SIC function.

When the simultaneous operation of the TX-RF 508 and RX-RF 510 is not present, or the signal properties have changed (e.g., the TX-RF 508 power level is reduced) in a way that the receiver does not experience a significant performance degradation due to the operation of the transmitter, the self-interference cancellation function may be disabled by the MRC 208. This may be considered as a power-saving mode of operation.

A desirable, but non-limiting, location for the cancellation function is in the digital front end of the receiver (RX-DFE 506).

The output of the RX-DFE 506 is thus a self-interference compensated RX signal that is applied to additional RX-BB circuitry for further receive processing (e.g., decoding, error corrections and so forth).

Note that in FIG. 5 a plurality of antennas 418, 420 may be used for the multi-system, multiradio embodiment, or the single antenna 316 may be used, such as when operating in the single system embodiment.

Note also that the various blocks shown in FIG. 5 may be viewed as method steps, and/or as operations that result from operation of computer program code, and/or as a plurality of coupled logic circuit elements constructed to carry out the associated function(s).

Based on the foregoing it should be apparent that the exemplary embodiments of this invention provide a method, apparatus and computer program product(s) to model an effect of at least transmitter analog circuitry-related operation on receiver analog circuitry operation, to apply a digital representation of a current TX signal to the model to generate a self-interference compensation signal, and to correct a received signal in the digital domain with the generated self-interference compensation signal.

The method, apparatus and computer program product(s) of the previous paragraph, where the model also represents at least some device-related RX signal impairments, including at least one of power supply noise, clock signal noise, and coupling between signal lines.

The method, apparatus and computer program product(s) of the previous paragraphs, where the model is controlled in accordance with current operating characteristics, including at least one of transmit timing relative to receive timing and transmit power level.

The method, apparatus and computer program product(s) of the previous paragraphs, where a device in which the method, apparatus and computer program product(s) are embodied in a single system communication device, and where the model represents full duplex operation.

The method, apparatus and computer program product(s) of the previous paragraphs, where a device in which the method, apparatus and computer program product(s) are embodied is a multi-system communication device, and where the model represents simultaneous operation of at least two radio interfaces associated with a transmitter of a first system and a receiver of a second system.

Figure 6:
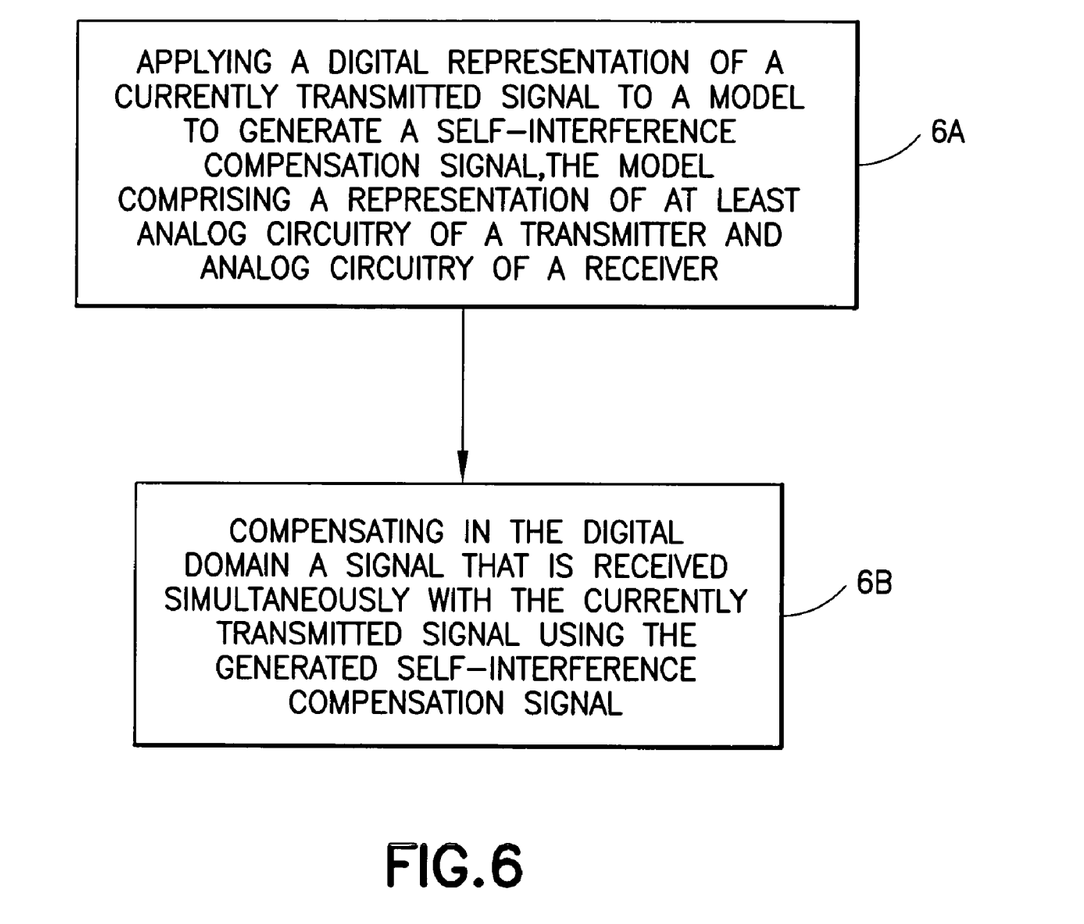
FIG. 6 is a logic flow diagram that is descriptive of the operation of a method, and the execution of a computer program, in accordance with the exemplary embodiments of this invention.

Referring to FIG. 6, in accordance with a method there is performed, at Block 6A, a step of applying a digital representation of a currently transmitted signal to a model to generate a self-interference compensation signal, the model comprising a representation of at least analog circuitry of a transmitter and analog circuitry of a receiver. At Block 6B there is performed a step of compensating, in the digital domain, a signal that is received simultaneously with the currently transmitted signal using the generated self-interference compensation signal.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

This being the case, and further in accordance with the exemplary embodiments of this invention, an integrated circuit comprises circuitry for implementing at least one transmit function and at least one receive function, and further comprises circuitry to model an effect of at least transmitter analog circuitry operation on receiver analog circuitry; circuitry to apply a digital representation of a current TX signal to the model to generate a self-interference compensation signal; and circuitry to correct a received signal in the digital domain with the generated self-interference compensation signal.

The integrated circuit of the previous paragraph, where the model also models an effect of receiver analog circuitry.

The integrated circuit of the previous two paragraphs, where the model also models an effect of at least one antenna.

The integrated circuit of the previous paragraphs, where the model also represents other potential RX-signal impairments including, but not limited to, at least one of power supply noise, clock signal noise and coupling between signal lines at least one of within the integrated circuit and external to the integrated circuit.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the various embodiments have been described above in the context of exemplary types of multi-radio systems, it should be appreciated that the embodiments of this invention are not limited for use with only the specifically mentioned types of wireless communication system, and that they may be used to advantage with other types of wireless communication systems.

Further, it should be appreciated that one or both of the transmitter(s) and receiver(s) may be based on a direct conversion architecture (e.g., one having a zero or nearly zero intermediate frequency (IF)), or on a more conventional heterodyne or super-heterodyne architecture.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   operating a processor to apply a digital representation of a currently transmitted signal to a model to generate a self-interference compensation signal, the model comprising a representation of at least analog circuitry of a transmitter and analog circuitry of a receiver; and
   operating the processor to compensate in the digital domain a signal that is received simultaneously with the currently transmitted signal using the generated self-interference compensation signal.

2. The method of claim 1, where the model also comprises a representation of at least one antenna, signal impairments, including at least one of power supply noise, clock signal noise, coupling between signal lines, and antenna coupling.

3. The method of claim 1, where the model is controlled in accordance with current operating characteristics, including at least one of transmit timing relative to receive timing and transmitter power level.

4. The method of claim 1, performed in a single system communication device, where the model represents full duplex operation of the transmitter and the receiver in the single system.

5. The method of claim 1, performed in a multi-system communication device, where the model represents simultaneous operation of at least the transmitter in a first system and the receiver in a second system.

6. The method of claim 1, where at least some of the analog circuitry of the transmitter and at least some of the analog circuitry of the receiver are contained within an integrated circuit, and where the model also comprises a representation of integrated circuit effects on the received signal.

7. The method of claim 6, where the integrated circuit also contains at least some transmitter baseband circuitry and at least some receiver baseband circuitry.

8. The method of claim 1, further comprising calibrating the model prior to applying the digital representation of the currently transmitted signal to the model.

9. A non-transitory computer readable data storage medium storing a program of computer-executable instructions, where execution of the instructions by a processor results in operations comprising:
   applying a digital representation of a currently transmitted signal to a model to generate a self-interference compensation signal, the model comprising a representation of at least analog circuitry of a transmitter and analog circuitry of a receiver; and
   compensating in the digital domain a signal that is received simultaneously with the currently transmitted signal using the generated self-interference compensation signal.

10. The data storage medium of claim 9, where the model also comprises a representation of at least one antenna and signal impairments, including at least one of power supply noise, clock signal noise, coupling between signal lines and antenna coupling effects, where at least some of the analog circuitry of the transmitter and at least some of the analog circuitry of the receiver are contained within an integrated circuit, and where the model also comprises a representation of integrated circuit effects on the received signal.

11. The data storage medium of claim 9, where the model is controlled in accordance with current operating characteristics, including at least one of transmit timing relative to receive timing and transmitter power level.

12. The data storage medium of claim 9, embodied in one of a single system communication device, where the model represents full duplex operation of the transmitter and the receiver in the single system, or in a multi-system communication device, where the model represents simultaneous operation of at least the transmitter in a first system and the receiver in a second system.

13. The data storage medium of claim 9, further comprising an operation of calibrating the model prior to the operation of applying the digital representation of the currently transmitted signal to the model.

14. An apparatus, comprising:
   at least one radio frequency transmitter;
   at least one radio frequency receiver;
   a copy block configurable to output a digital representation of a currently transmitted signal; and
   a model comprising a representation of at least analog circuitry of the at least one radio frequency transmitter and analog circuitry of the at least one radio frequency receiver, said model generating in response to the digital representation of the currently transmitted signal a self-interference compensation signal to compensate in the digital domain a signal that is received simultaneously with the currently transmitted signal.

15. The apparatus of claim 14, where the model also comprises a representation of at least one antenna, signal impairments, including at least one of power supply noise, clock signal noise, coupling between signal lines, and antenna coupling.

16. The apparatus of claim 14, further comprising a controller configurable to control the model in accordance with current operating characteristics of the device, including at least one of transmit timing relative to receive timing and transmitter power level.

17. The apparatus of claim 14, embodied as a single system communication device, and where the model represents full duplex operation of the transmitter and the receiver in the single system, including a presence of at least one antenna.

18. The apparatus of claim 14, embodied as a multi-system communication device, and where the model represents simultaneous operation of at least the transmitter in a first system and the receiver in a second system, including a presence of at least one antenna.

19. The apparatus of claim 14, where at least some of the analog circuitry of the transmitter and at least some of the analog circuitry of the receiver are contained within an integrated circuit, and where the model also comprises a representation of integrated circuit effects on the received signal.

20. The apparatus of claim 19, where the integrated circuit also contains at least some transmitter baseband circuitry and at least some receiver baseband circuitry.

21. The apparatus of claim 14, further comprising a controller configurable to calibrate the model.

22. The apparatus of claim 14, further comprising control means for calibrating and controlling operation of the modeling means.

23. An integrated circuit, comprising:
at least a portion of at least one radio frequency transmitter;
at least a portion of at least one radio frequency receiver;
a copy block configurable to output a digital representation of a currently transmitted signal; and
a controller configurable to operate a model in accordance with current operating characteristics, the model comprising a representation of at least analog circuitry of the at least one radio frequency transmitter and analog circuitry of the at least one radio frequency receiver, said model generating in response to the digital representation of the currently transmitted signal a self-interference compensation signal to compensate in the digital domain a signal that is received simultaneously with the currently transmitted signal.

24. The integrated circuit of claim 23, where the model also comprises a representation of at least one antenna, signal impairments, including at least one of power supply noise, clock signal noise, coupling between signal lines, antenna coupling, and an effect of the integrated circuit on the received signal.

25. The integrated circuit of claim 23, where the current operating characteristics comprise at least one of transmit timing relative to receive timing and transmitter power level.

26. The integrated circuit of claim 23, embodied in a single system communication apparatus, where the model represents full duplex operation of the transmitter and the receiver in the single system.

27. The integrated circuit of claim 23, embodied in a multi-system communication apparatus, where the model represents simultaneous operation of at least the transmitter in a first system and the receiver in a second system.

28. The integrated circuit of claim 23, where the model also comprises a representation of integrated circuit internal coupling mechanisms and their effect on the received signal.

29. The integrated circuit of claim 23, where the integrated circuit further comprises at least one of transmitter baseband circuitry and receiver baseband circuitry.

30. The integrated circuit of claim 23, where the controller is further configurable to calibrate the model.

31. An apparatus, comprising:
means for transmitting at least one radio frequency signal;
means for receiving at least one radio frequency signal;
means for outputting a digital representation of a currently transmitted radio frequency signal; and
means for modeling a representation of at least analog circuitry of the transmitting means and analog circuitry of the receiving means, said modeling means generating in response to the digital representation of the currently transmitted signal a self-interference compensation signal for compensating in the digital domain a radio frequency signal that is received simultaneously with the currently transmitted radio frequency signal.

32. The apparatus of claim 31, where said modeling means also comprises a representation of at least one antenna, signal impairments, including at least one of power supply noise, clock signal noise, coupling between signal lines, and antenna coupling.

33. The apparatus of claim 31, further comprising means for controlling the modeling means in accordance with current operating characteristics, including at least one of transmit timing relative to receive timing and transmitter means power level.

34. The apparatus of claim 31, embodied in one of a single system communication apparatus, where the modeling means represents full duplex operation of the transmitter means and the receiver means, including a presence of at least one antenna, or in a multi-system communication apparatus, where the modeling means represents simultaneous operation of at least the transmitter means in a first system and the receiver means in a second system, including a presence of at least one antenna.

35. The apparatus of claim 31, where at least some of the analog circuitry of the transmitter means and at least some of the analog circuitry of the receiver means are contained within an integrated circuit, and where the modeling means also comprises a representation of an effect of the integrated circuit on the received signal, and where the integrated circuit also contains at least some baseband circuitry.

* * * * *